(12) United States Patent
Wittefeldt et al.

(10) Patent No.: US 7,474,955 B2
(45) Date of Patent: Jan. 6, 2009

(54) METHOD AND APPARATUS FOR AIR FUEL RATIO ADJUSTMENT

(75) Inventors: Thomas Wittefeldt, Huddinge (SE);
Richard Backman, Södertälje (SE);
Erik Sunnegårdh, Älvsjö (SE); Staffan Seth, Järfälla (SE)

(73) Assignee: GM Global Technology Operations, Inc., Detroit, MI (US)

( * ) Notice: Subject to any disclaimer, the term of this patent is extended or adjusted under 35 U.S.C. 154(b) by 34 days.

(21) Appl. No.: 11/655,976

(22) Filed: Jan. 22, 2007

(65) Prior Publication Data
US 2007/0185641 A1 Aug. 9, 2007

(30) Foreign Application Priority Data
Jan. 23, 2006 (SE) .................................. 0600149

(51) Int. Cl.
*F02D 41/04* (2006.01)
*G06F 17/00* (2006.01)

(52) U.S. Cl. ..................... 701/109; 123/679
(58) Field of Classification Search ................. 701/103, 701/106, 109, 104, 105, 110; 123/481, 443, 123/679, 672, 698, 699, 704, 1 A, 575, 492, 123/493, 494
See application file for complete search history.

(56) References Cited

U.S. PATENT DOCUMENTS

| 4,149,502 | A | * | 4/1979 | Johnson et al. | ............. 123/692 |
|---|---|---|---|---|---|
| 4,967,714 | A | * | 11/1990 | Inoue | ......................... 123/694 |
| 5,150,301 | A | * | 9/1992 | Kashiwabara et al. | ........ 701/106 |
| 5,178,121 | A | | 1/1993 | Kitajima et al. | ............. 123/689 |
| 5,197,450 | A | | 3/1993 | Kitajima et al. | ............. 123/479 |
| 5,253,631 | A | | 10/1993 | Curran | ......................... 123/696 |
| 5,553,593 | A | * | 9/1996 | Schnaibel et al. | ........... 123/682 |
| 6,543,219 | B1 | * | 4/2003 | Surnilla | ....................... 60/285 |
| 6,755,182 | B1 | * | 6/2004 | Kolmanovsky et al. | ..... 123/478 |
| 6,851,416 | B1 | * | 2/2005 | DeWitte et al. | ............. 123/575 |
| 7,146,799 | B2 | * | 12/2006 | Bidner et al. | .................. 60/285 |
| 7,278,396 | B2 | * | 10/2007 | Leone et al. | ................. 123/431 |

* cited by examiner

*Primary Examiner*—Willis R. Wolfe, Jr.
*Assistant Examiner*—Johnny H. Hoang
(74) *Attorney, Agent, or Firm*—Harness, Dickey & Pierce

(57) ABSTRACT

The air fuel ratio of an engine adapted to run on a mixture of alcohol and gasoline can be adapted by a method wherein the air fuel ratio is controlled using an ethanol adaptation value, including reducing the enrichment factor from an initial value until a lean switch from rich conditions to lean conditions is detected, determining a first enrichment factor value at which the lean switch occurs, increasing the enrichment factor until a rich switch from lean conditions to rich conditions is detected, determining a second enrichment factor value at which the rich switch occurs, calculating the average value between the first enrichment factor value and the second enrichment factor value, adjusting the air fuel ratio using the average value.

10 Claims, 4 Drawing Sheets

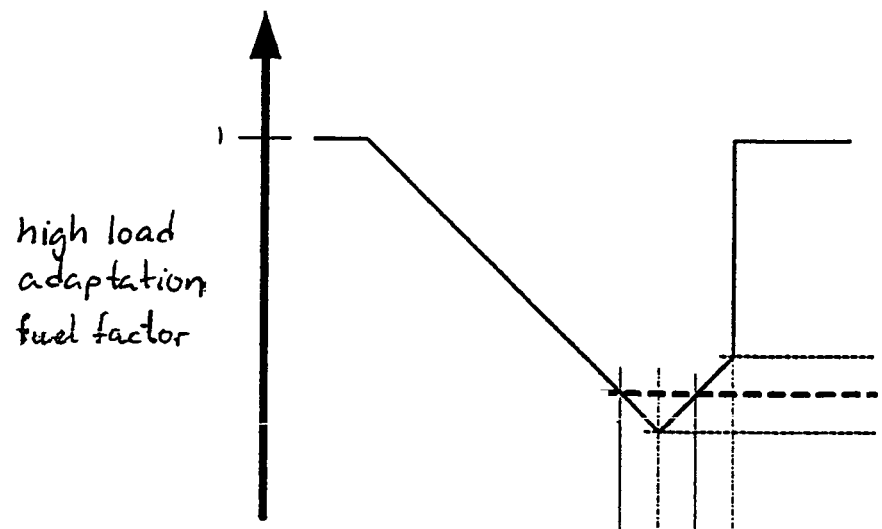
Fig. 4a
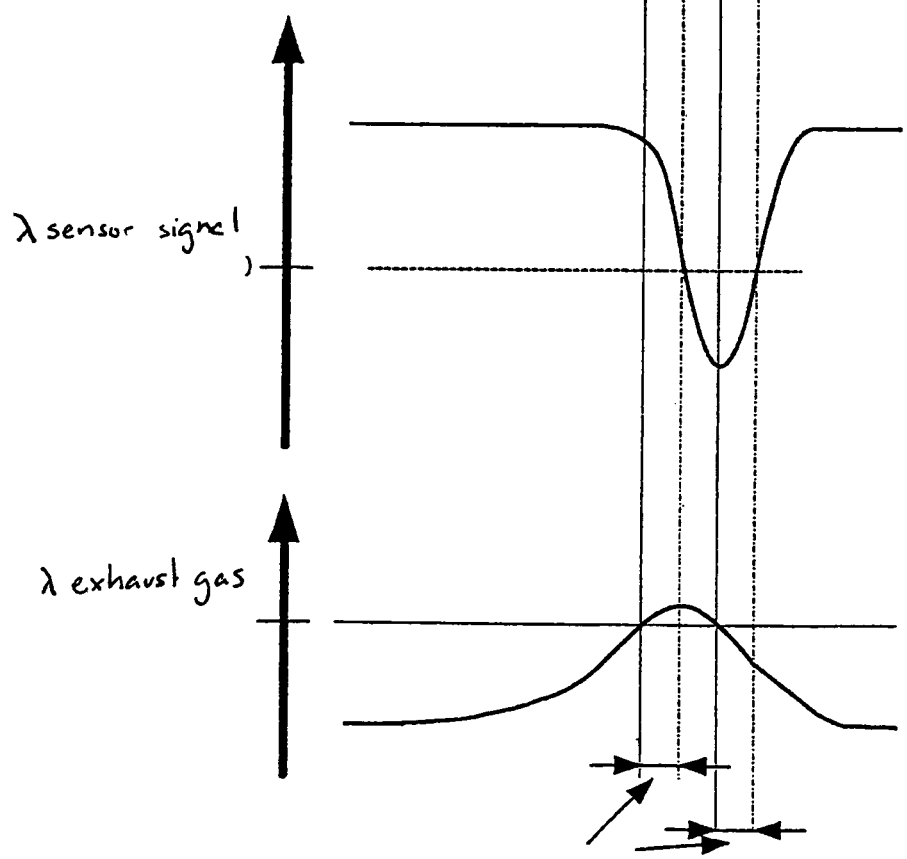
Fig. 4b
Fig. 4c

METHOD AND APPARATUS FOR AIR FUEL RATIO ADJUSTMENT

PRIORITY STATEMENT

This application claims benefit of priority under 35 U.S.C. § 119 from Swedish Patent Application No. 0600149-9 filed on Jan. 23, 2006, in the Swedish Patent Office, the disclosure of which is incorporated herein by reference in its entirety.

TECHNICAL FIELD

The present invention relates to a method for adjusting the air fuel ratio of an engine adapted to run on a mixture of alcohol and gasoline. The invention also relates to a computer program product and a control unit for performing such a method.

BACKGROUND AND PRIOR ART

There is an increasing desire to find more environmentally friendly fuels for cars than pure gasoline. Among the alternatives considered are alcohols such as ethanol and methanol, and blends of gasoline and alcohol in varying proportions.

Flexible Fuel Vehicles are automobiles or light trucks that are able to operate on multiple fuel blends. The usable fuels include regular gasoline as well as several alternative fuels such as M-85 (85% Methanol & 15% gasoline), E-85 (85% Ethanol & 15% gasoline) or pure mixed alcohol.

To be able to operate on different fuel blends, flexible fuel vehicles comprise an engine control unit, which among other things, is arranged to run a fuel adaptation algorithm. This processor detects what fuel blend is being used and automatically adjusts the engine's ignition timing and air/fuel mixture ratios accordingly by means of the fuel adaptation algorithm. The engine control unit adjusts the engine's optimum performance for any ratio of gasoline to fuel alcohol.

After each refuelling event the new ethanol or methanol rate must be detected and the control unit must be adapted to the new rate. This adaptation must be fully performed in order to avoid engine breakdown caused by high temperature at high loads.

Lambda control is used to optimize the air fuel ratio provided to the engine. A lambda sensor monitors the oxygen differential between the exhaust pipe and the atmosphere. This value is used to adjust the air fuel ratio in order to get an optimal exhaust gas catalyst conversion efficiency.

The fuel adaptation algorithms known in the art can only be executed when the vehicle's lambda closed loop controller is active. The lambda closed loop controller can only be active in a part of the engine's operating range, which is limited both by engine speed and by load. Outside this area the fuelling of the engine must be accurately pre-controlled to avoid potential engine damage due to exceeded limits for the engine hardware and catalyst (exhaust gas over temperatures etc.). If a fuel adaptation has not been executed and the present ethanol rate has not yet been securely detected the speed and load has to be limited to where the lambda closed loop controller can be active. This leads to a considerable performance loss when the engine is working outside of this part of the working area. Such performance losses are experienced as highly unsatisfactory by the driver.

OBJECT OF THE INVENTION

It is an object of the invention to enable fuel adaptation in the whole working area of the engine, in particular at high loads.

SUMMARY OF THE INVENTION

This object is achieved according to the present invention by a method of adjusting the air fuel ratio of an engine adapted to run on a mixture of alcohol and gasoline, said air fuel ratio being controlled by means of an ethanol adaptation value, comprising the following steps:

Reducing the enrichment factor from an initial value until a lean switch from rich conditions to lean conditions is detected, Determining a first enrichment factor value at which the lean switch occurs, Increasing the enrichment factor until a rich switch from lean conditions to rich conditions is detected, Determining a second enrichment factor value at which the rich switch occurs, Calculating the average value between the first enrichment factor value and the second enrichment factor value, Adjusting the air fuel ratio by means of said average value.

The invention is based on the fact that rich or lean conditions are usually detected as a binary value. That is, the value simply states if rich or lean conditions are present, without stating any amount. The value changes when conditions change form lean to rich or vice versa. Therefore, according to the invention, the value at which the conditions are optimal is detected as the average between the value where a lean switch occurs and the value where a rich switch occurs.

The high load ethanol rate adaptation algorithm according to the invention enables ethanol rate adaptation at a wider range of engine speeds and loads than the prior art methods. It may be used at any engine load, but will be particularly useful at high loads. The inventive adaptation algorithm is performed during the first ethanol adaptation after a refuel event.

To ensure rich conditions, the following steps are preferably performed before reducing the enrichment factor:

Determining if rich conditions or lean conditions are present, and

If lean conditions are determined, performing a fuel enrichment to achieve rich conditions.

The adjustment of the air fuel ratio may be performed by multiplying the average value by the ethanol adaptation value or by a fuel enrichment factor representative of conditions not related to the ethanol content of the fuel. Alternatively, the adjustment may be performed by multiplying a basic air fuel ratio value by the average value.

In a preferred embodiment the lean switch and the rich switch are detected by means of a lambda sensor connected at the engine outlet. Lambda sensors are common in motor vehicles.

The method preferably comprises the step of setting the enrichment factor value to the initial value, which is preferably 1, after the rich switch.

The object is also achieved by a computer program product comprising computer readable code which, when run in a processor of an engine control unit causes the engine control unit to perform the inventive method. This computer program is normally arranged to be run in the engine control unit, but it may be arranged to run in a separate control unit.

The object is also achieved by a control unit for controlling the fuel injection to an engine that can run on a mixture of alcohol and gasoline, said control unit comprising receiving means for receiving a sensor value indicative of rich conditions or lean conditions for the engine, and a computer program product according to the above. This control unit is preferably the engine control unit already present in the vehicle.

Variables:

In the calculations discussed below, the following variables will be used:

EnrFacTemp: The instantaneous enrichment factor,

Adap_EnrFac: The enrichment factor used for the current fraction of ethanol in the fuel MaxEnrFac: The theoretical maximum value for the enrichment factor, based on the maximum fraction of alcohol that the current fuel blend can comprise LowEnrFac: The enrichment factor corresponding to a switch to lean conditions, used in the high-load adaptation algorithm according to the invention HighEnrFac: The enrichment factor corresponding to a switch to rich conditions, used in the high load adaptation algorithm according to the invention TotFuelFac: The fuel factor indicating all other adjustments of the fuel factor before the inventive correction for ethanol content EnrFacAverage: The average value between LowEnrFac and HighEnrFac, indicating the enrichment factor for which lambda=1.

EnrFacOut: the output value for the enrichment factor, which is used to control the fuel injection. This value is used as the new Adap_EnrFac.

BRIEF DESCRIPTION OF THE DRAWINGS

The invention will be described in more detail in the following, by way of example and with reference to the appended drawings in which:

FIGS. 4a-4c illustrate the process according to the invention.

DETAILED DESCRIPTION OF EMBODIMENTS

Figure 1:
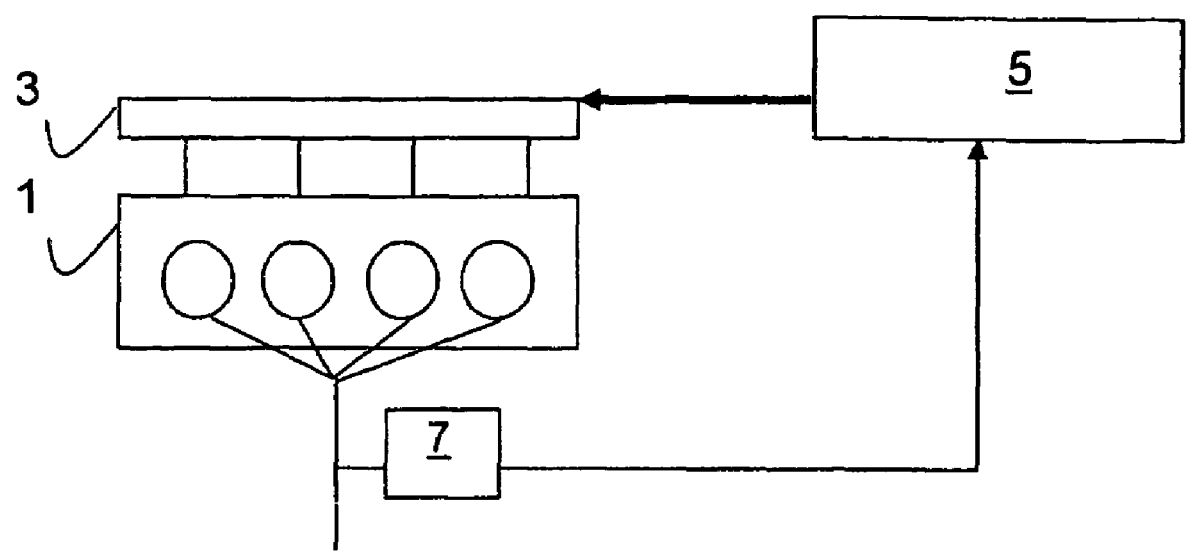
FIG. 1 illustrates an engine having a lambda control function known per se, and a fuel adaptation function according to the invention.

FIG. 1 illustrates a vehicle engine 1 having an air/fuel inlet 3. The engine, and the air/fuel inlet 3 are controlled by an engine control unit 5. The engine control unit 5 comprises control software controlling the fuel enrichment factor according to prior art methods, and for performing the inventive method. In general, the control unit calculates a basic fuel value indicating the amount of fuel that should be supplied to the engine. It is known in the art that this basic fuel value can be corrected for a number of different conditions. For example, more fuel is needed if the engine is cold. Therefore, the control unit 5 can calculate one or more correction factors to be multiplied by the basic fuel value, to obtain an adjusted air fuel ratio. The invention proposes another such correction factor, or enrichment factor, to enable fuel adaptation outside of the working area in which the lambda controller is active.

As is common in the art, an oxygen sensor, called a lambda sensor 7, is placed at the engine outlet is used to determine the oxygen content of the exhaust. The value sensed by the lambda sensor is fed to the control unit 5 and is used to control the air fuel ratio on the engine's input. The engine control unit 5 comprises a computer program arranged to run an algorithm, known in the art, to produce an adaptation value for the fuel factor. According to the invention the control unit 5 also comprises a computer program arranged to run an algorithm for high load adaptation of the air fuel ratio.

The engine control unit 5 may be used to control a number of functions related to the engine or other parts of the vehicle. To this end, the engine control unit 5 may receive parameter values or signals from a number of other sensors (not shown) as well as the lambda sensor 7.

Traditionally lean or rich conditions are determined by means of the values from the lambda sensor 7. Low oxygen levels in the exhaust means the engine is running rich, while high oxygen levels indicate a lean condition. The lambda sensor provides a binary value which is high if lambda>1 and low if lambda<1. There is no indication of the actual lambda value, only of the direction in which the fuel factor should be adjusted, that is, whether there are rich or lean conditions.

When activating the high load-adaptation according to the invention, the lambda sensor value is evaluated and different actions are taken if the sensor indicates rich or lean conditions.

If lean conditions are detected the first action is to perform a fast enrichment. The fuel is enriched by setting the present air/fuel ratio to the lowest possible air/fuel ratio calculated within the refuel algorithm. By doing this, the fuelling will switch rapidly from lean to rich, which will, in turn, be detected by the lambda sensor 7.

Figure 3:
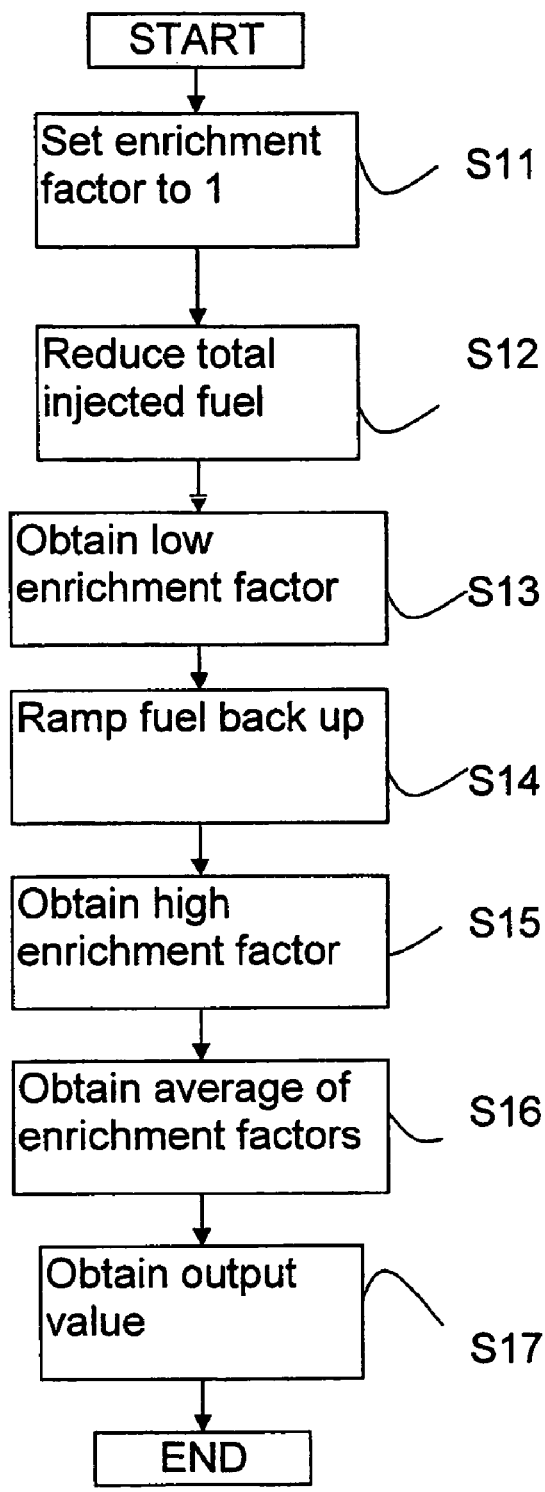
FIG. 3 is a flow chart of the inventive method.

If rich conditions are detected, either directly or after the fuel enrichment described above, the inventive high load adaptation ramping sequence as described in FIG. 3 is started. The sequence will run and set a new adaptation value. The output from the high load ethanol rate adaptation algorithm is limited by the minimum and maximum air/fuel ratios calculated in the refuelling algorithm. The minimum and maximum air fuel ratios are based on the maximum and minimum possible content of alcohol in the fuel, respectively. This in turn, may be determined based on knowledge of the amount of fuel in the tank, and its alcohol content, before refuelling, the amount of new fuel supplied and the possible alcohol content of the new fuel. For example, it may be known that the fuel supplied at gas stations can comprise no alcohol, or 85% alcohol.

Figure 2:
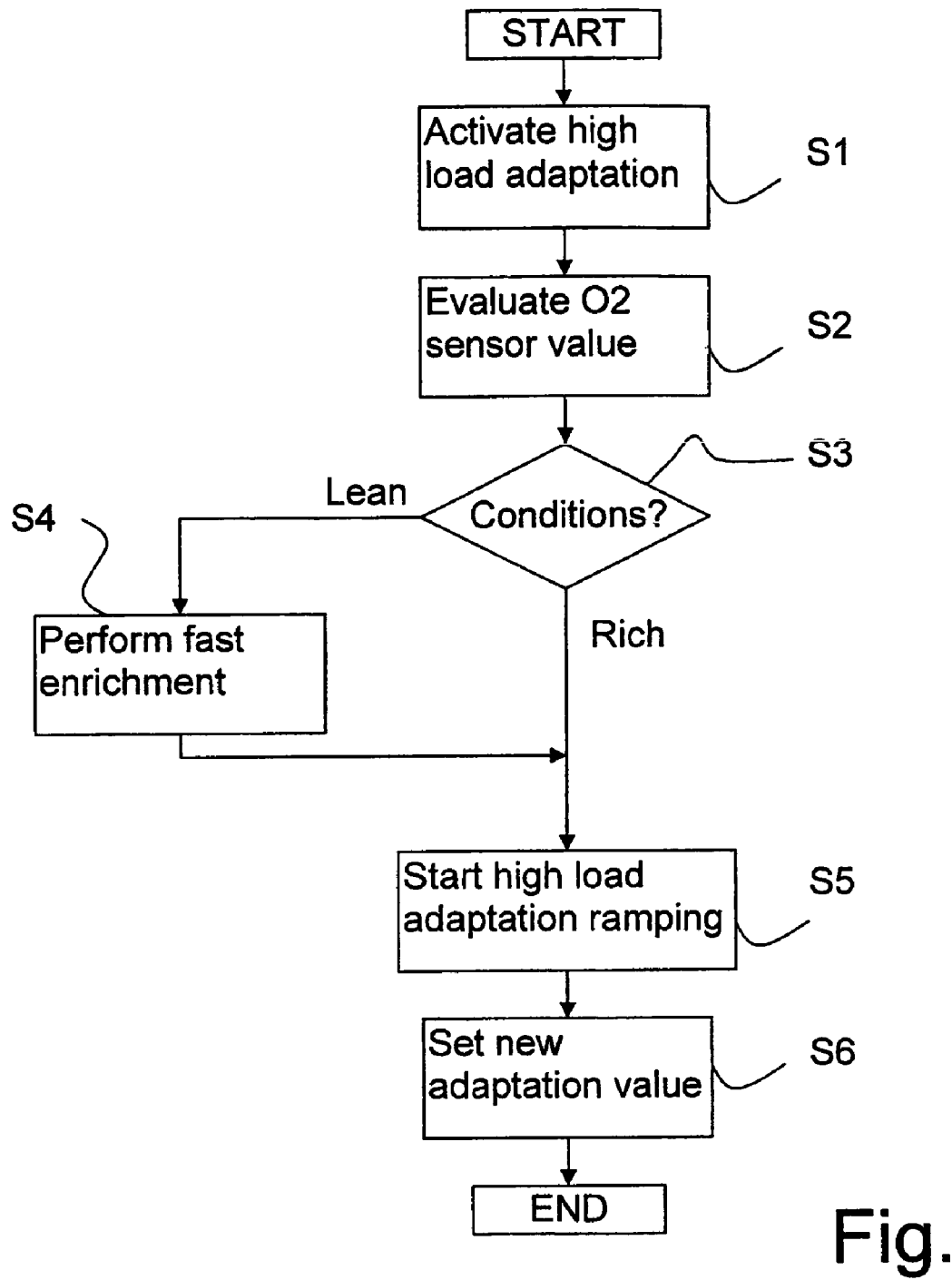
FIG. 2 is a flow chart of preparatory steps for the inventive method

FIG. 2 is a flow chart of the preparations needed to perform the inventive method:

In step S1 the high load adaptation mode is activated.

In step S2 the oxygen sensor value is evaluated.

In step S3 lean or rich condition is determined. If lean condition, go to step S4; if rich condition, go to step S5.

In step S4 a fast enrichment is performed as described below.

In step S5 the high load adaptation ramping is started, as described in FIG. 3.

In step S6 the new adaptation value is set.

The following conditions must be fulfilled before entering the high load adaptation mode in step S1:

The lambda controller has to be in open loop mode, that is, the lambda control functions must be disabled.

The saved absolute value of the filtered lambda integrator fuel factor has to be outside the defined limit.

The first ethanol adaptation must be triggered or activated

If there is a choice to enable/disable the high load adaptation, it must be enabled.

The normal lambda integrator closed loop must be frozen, preferably at the value it had when the high load conditions were entered.

There must be no detected faults on the lambda sensor.

The engine must be running and the vehicle must be moving.

If these conditions are true a request for high load adaptation is set, and the inventive algorithm is activated.

If, at any time, any of the above mentioned conditions are not fulfilled, the high load adaptation sequence is terminated and the old ethanol adaptation value will still be valid. In this case, if lean conditions were detected and an emergency enrichment has been performed, the new, lower air/fuel ratio will be kept.

If lean conditions are present after a delay time, which may be configured, fuel compensations must be performed quickly to avoid damage to the engine, as stated in step S4 above. In this case the temporary high load adaptation factor is set equal to the maximum possible value according to the following calculation:

$$EnrFacTemp = MaxEnrFac/Adap\_EnrFac \quad (1)$$

Where EnrFacTemp is the temporary high load adaptation factor, MaxEnrFac is the maximum possible enrichment factor and Adap_EnrFac is the adaptation value. In this way, rich conditions are achieved.

The value of EnrFacTemp is preferably calculated in the control unit 5. The maximum enrichment factor is forced in without ramps or other delays.

If rich conditions are present the method illustrated in FIG. 3 is started. In step S11 EnrFacTemp is set to 1. Since the compensation is based on multiplication, this means that no compensation according to the inventive method is carried out.

In step S12, the total injected fuel is reduced by changing EnrFacTemp until a lean oxygen sensor switch occurs.

In step S13, the fuel factor needed to reduce the fuelling is multiplied by the present total fuel enrichment factor and saved as $$LowEnrFac = EnrFacTemp_{low} * TotFuelFac \quad (2)$$

Where $EnrFacTemp_{low}$ is the value of EnrFacTemp when the lean oxygen sensor switch occurs and TotFuelFac is the fuel factor adjustment as explained above.

In step S14, the fuel is ramped back up until a rich switch occurs and in step S15 the enrichment factor when a rich oxygen sensor switch occurs, HighEnrFac, is determined as follows:

$$HighEnrFac = EnrFacTemp_{high} * TotFuelFac \quad (3)$$

Where $EnrFacTemp_{high}$ is the value of EnrFacTemp when the rich oxygen sensor switch occurs.

In step S16, the average EnrFacAverage of these two enrichment factors is obtained.

This average is a good approximation of the high load adaptation fuel factor for which lambda=1.

In step S17, the average obtained in step S16 is multiplied by the present ethanol adaptation value to form the output value from the high load adaptation. This output value is used to control the fuel injection to the engine.

FIG. 4a is a curve illustrating the procedure shown in FIG. 3. Rich condition is assumed. If lean conditions are present, rich conditions must be created, as discussed above. The enrichment factor is shown as a function of time. Starting at the value 1.0, the enrichment factor is ramped down until a lean switch occurs and is subsequently ramped back up until a rich switch occurs. The low enrichment factor, indicated by a dotted line, is the enrichment factor at which the lean switch occurs and the high enrichment factor, also indicated by a dotted line, is the enrichment factor at which the rich switch occurs. The average enrichment factor is shown as a dashed line. This average enrichment factor is used to calculate the output value as disclosed above.

FIG. 4b illustrates the sensor signal from the lambda sensor as a function of time, concurrent to the curve in FIG. 4a. The O2 level follows the high load adaptation fuel factor, with a delay caused by gas transport time and oxygen sensor delay. As can be seen, the O2 level at the front O2 sensor is stable until just before the lean switch occurs, when it starts to drop. Just after the ramping up starts the front O2 sensor signal starts to increase and when the, fuel factor is restored to 1, the O2 sensor signal soon returns to its start level.

FIG. 4c illustrates the actual lambda value in the exhaust gas when the procedure shown in FIG. 4a is performed. The lambda value may be detected in test systems. A solid horizontal line indicates the level where lambda=1. As can be seen, the actual lambda value is low initially then increases to a bit higher than 1 at the time of the switch. When the enrichment factor is restored to 1, the lambda value gradually returns to its initial value.

The invention claimed is:

1. A method of adjusting the air fuel ratio of an engine adapted to run on a mixture of alcohol and gasoline, said air fuel ratio being controlled by means of an ethanol adaptation value, the method comprising:
    reducing an enrichment factor from an initial value until a lean switch from rich conditions to lean conditions is detected by an oxygen sensor,
    determining a first enrichment factor value based on the value of the enrichment factor of the lean switch,
    increasing the enrichment factor until a rich switch from lean conditions to rich conditions is detected by the oxygen sensor,
    determining a second enrichment factor value based on the value of the enrichment factor of the rich switch,
    calculating an average value between the first enrichment factor value and the second enrichment factor value,
    adjusting the air fuel ratio using said average value.

2. The method according to claim 1, wherein the following steps are performed before reducing the enrichment factor:
    determining if rich conditions or lean conditions are present, and
    if lean conditions are determined, performing a fuel enrichment to achieve rich conditions.

3. The method according to claim 1 wherein said adjustment of the air fuel ratio is performed by multiplication of the ethanol adaptation value by the average value.

4. The method according to claim 1, wherein the adjustment of the air fuel ratio is performed by multiplication of a fuel enrichment factor representative of conditions not related to the ethanol content of the fuel, by the average value.

5. The method according to claim 1, wherein the adjustment of the air fuel ratio is performed by multiplication of a basic air fuel ratio value by the average value.

6. The method according to claim 1, wherein the oxygen sensor is a lambda sensor connected to the engine exhaust.

7. The method according to claim 1, further comprising the step of setting the enrichment factor value to the initial value after the rich switch.

8. The method according to claim 1, wherein the initial value of the enrichment factor is 1.

9. A computer program product stored on a medium and comprising computer readable code which, when run in a processor of an engine control unit for controlling the fuel injection to an engine that can run on a mixture of alcohol and gasoline, said engine control unit receiving a sensor value indicative of rich conditions or lean conditions for the engine and adjusting the air fuel ratio, said air fuel ratio being controlled using an ethanol adaptation value, causes the engine control unit to perform the steps of:

reducing an enrichment factor from an initial value until a lean switch from rich conditions to lean conditions is detected, determining a first enrichment factor value at which the lean switch occurs, increasing the enrichment factor until a rich switch from lean conditions to rich conditions is detected, determining a second enrichment factor value at which the rich switch occurs, calculating the average value between the first enrichment factor value and the second enrichment factor value, adjusting the air fuel ratio using the average value.

10. A control unit for controlling the fuel injection to an engine that can run on a mixture of alcohol and gasoline, said control unit including receiving a sensor value indicative of rich conditions or lean conditions for the engine, and a computer program product stored on a medium and including computer readable code which, when run in a processor of the control unit causes the control unit to perform the steps of:

reducing an enrichment factor from an initial value until a lean switch from rich conditions to lean conditions is detected, determining a first enrichment factor value at which the lean switch occurs, increasing the enrichment factor until a rich switch from lean conditions to rich conditions is detected, determining a second enrichment factor value at which the rich switch occurs, calculating the average value between the first enrichment factor value and the second enrichment factor value, adjusting the air fuel ratio using the average value.

* * * * *